United States Patent [19]
Arhab et al.

[11] Patent Number: 5,826,688
[45] Date of Patent: Oct. 27, 1998

[54] TORSION DAMPER FOR A LOCKING CLUTCH AND A LOCKING CLUTCH INCLUDING SUCH A TORSION DAMPER

[75] Inventors: Rabah Arhab, St. Brice sous Forêt; Luc Thevenon, Paris, both of France

[73] Assignee: Valeo, Paris, France

[21] Appl. No.: 715,411

[22] Filed: Sep. 18, 1996

[30] Foreign Application Priority Data

Sep. 19, 1995 [FR] France .................................. 95 10960

[51] Int. Cl.⁶ ..................................................... F16D 3/14
[52] U.S. Cl. ......................................... 192/3.29; 192/212
[58] Field of Search .................... 192/3.29, 212, 192/213; 464/67

[56] References Cited

U.S. PATENT DOCUMENTS

| | | |
|---|---|---|
| 4,274,519 | 6/1981 | Moroto et al. . |
| 4,697,417 | 10/1987 | Billet et al. .......................... 192/212 X |
| 4,722,715 | 2/1988 | Billet et al. ............................ 464/67 X |
| 5,056,631 | 10/1991 | Macdonald .............................. 192/3.29 |
| 5,385,222 | 1/1995 | Otto et al. ................................ 192/3.29 |
| 5,655,635 | 8/1997 | Yuergens et al. ....................... 192/3.29 |

FOREIGN PATENT DOCUMENTS

| | | |
|---|---|---|
| 0191698 | 8/1986 | European Pat. Off. . |
| 3934798 | 4/1991 | Germany . |
| 94-07058 | 3/1994 | WIPO . |

*Primary Examiner*—Charles A. Marmor
*Assistant Examiner*—Saul Rodriguez
*Attorney, Agent, or Firm*—Longacre & White

[57] ABSTRACT

A torsion damper for a locking clutch able to act between the driving element and the driven element of a hydrokinetic coupling device, has two coaxial parts able to move with respect to each other and counter to circumferentially acting springs, namely an input part provided with a guide washer and an output part provided with a web. The guide washer has a holding portion in the shape of a half-shell and bearing portions bordering on circumferentially extending apertures receiving the springs, to respectively hold the springs and enable them to bear. The web also has bearing portions to enable the springs to bear. The guide washer consists of two parts, a first part and a second part, assembled by crimping.

4 Claims, 3 Drawing Sheets

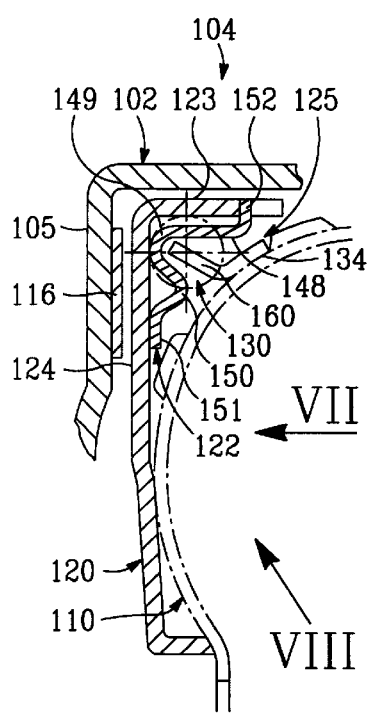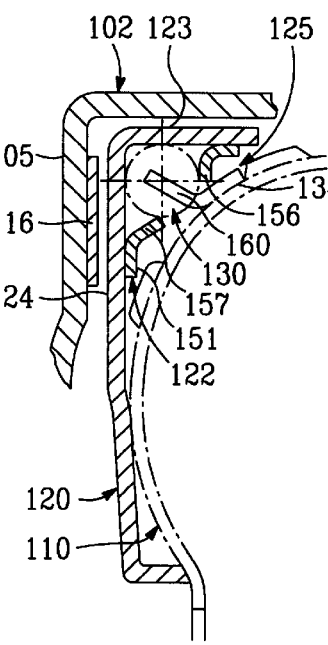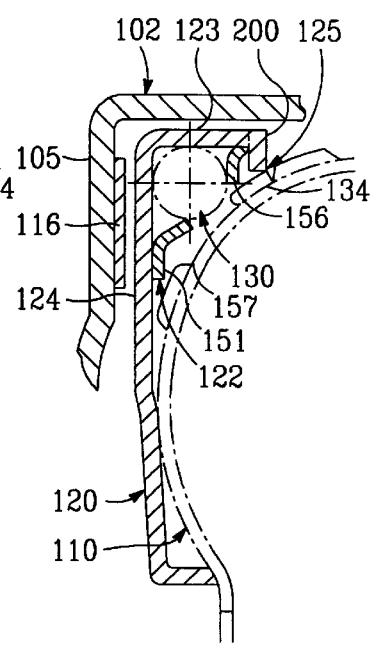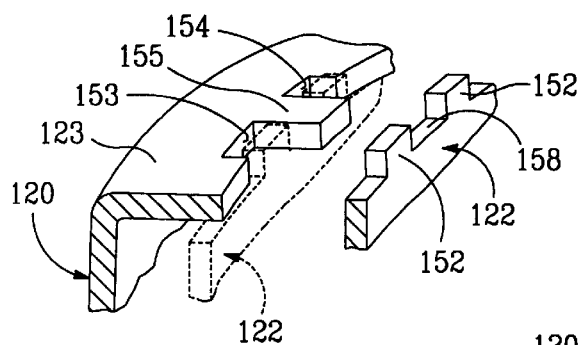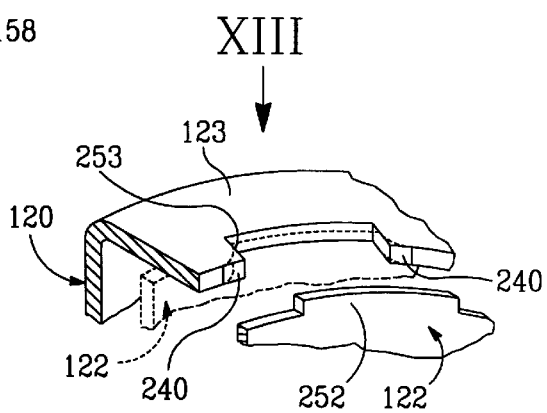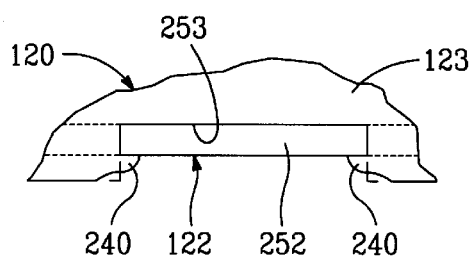

TORSION DAMPER FOR A LOCKING CLUTCH AND A LOCKING CLUTCH INCLUDING SUCH A TORSION DAMPER

FIELD OF THE INVENTION

The present invention concerns torsion dampers for locking clutches able to act between a driving element and a driven element of a hydrokinetic coupling device, notably for motor vehicles, and locking clutches equipped with such a torsion damper.

BACKGROUND OF THE INVENTION

As is known, a locking clutch, usually known as a "LOCK-UP" clutch, for a hydrokinetic coupling device acting between a driving element and a driven element, particularly for a motor vehicle, comprises a torsion damper, a piston mounted so as to move axially, at least one friction lining associated with the piston and suitable for being clamped between the said piston and a transverse wall integral with the driving element.

The torsion damper includes an input part, an output part and springs interposed circumferentially between the said input and output parts, in order to couple them together.

Such a clutch is described for example in the document WO-A-94/07058.

In this document, more precisely the torsion damper has two coaxial parts mounted so as to be movable with respect to each other and counter to circumferentially acting springs, namely an input part provided with a guide washer and an output part provided with a web. The guide washer has a holding portion in the shape of a half-shell and bearing portions to respectively hold the springs on the outside and enable them to bear, while the web also has bearing portions to enable the springs to bear.

The guide washer surrounds the web at least for the most part. The web has a holding portion in the shape of a half-shell, to hold the springs radially, the bearing portions of the web being carried by the said holding portion of the web and the said holding portions of the guide washer and of the web being axially offset with respect to each other.

Such a design results in a small number of parts, is easy to assemble and affords satisfaction.

DISCUSSION OF THE INVENTION

The present invention aims to arrange a torsion damper of the above type so that the constituent parts are even more simple to produce and their assembly even easier to effect.

According to the invention, a torsion damper for a locking clutch able to act between the driving element and the driven element of a hydrokinetic coupling device, having two coaxial parts able to move with respect to each other counter to circumferentially acting springs, namely an input part provided with a guide washer and an output part provided with a web, in which the guide washer has a holding portion in the shape of a half-shell and bearing portions bordering on circumferentially extending apertures receiving the springs, to respectively hold the springs and enable them to bear, while the web also has bearing portions to enable the springs to bear, wherein the guide washer consists of two parts, a first part and a second part, assembled by crimping, and in that the second part retains the springs on the outside.

According to a first variant, the first part is an annular part whose even section through a plane passing through the axis is in the overall shape of an inverted L with a transverse lateral wall extended on its external part by a skirt extending axially.

Advantageously, the second part is in the shape of a ring extending transversely.

The second part and the transverse lateral wall of the first part are positioned axially on each side of the web.

The skirt of the first part covers the external periphery of the web

Advantageously, the holding portion is formed by the skirt and by flaps with which the apertures in the guide washer are provided.

Preferably, the second part is provided on its external periphery with circumferentially extending slots through which there pass axial lugs on the skirt of the first part; the axial lugs are provided at their end with fingers narrower than the axial lugs and defining steps which are crimped to fix the first and second parts together; the fingers extend axially beyond the second part and are designed to fit into notches formed on the external periphery of a friction disc provided on each of its faces with a friction lining.

According to a second variant, the friction lining is carried by the driving element and the first part consists of a piston; the first part has a transverse wall and has on its external periphery an axially oriented skirt.

Advantageously, the web is a ring having lugs for supporting the springs.

Preferably, the second part is an annular part having bearing surfaces for the springs consisting of the edges of areas of which an axial one extends axially parallel to the skirt; the second part is fixed to the skirt by transverse lugs carried by the free end of the axial area; the transverse lugs are grouped in pairs, each pair being spaced apart by a notch, the skirt having notches in which the said transverse lugs are fitted, the notches formed in the skirt being separated by a finger, in the notch separating two transverse lugs of the same pair, the end of which is folded over by crimping; according to another embodiment, the second part has transverse lugs fitted in notches in the skirt whose free edges are axially battered.

The present invention also has as its object a locking clutch mounted between the casing and the turbine wheel of a hydrokinetic coupling device, notably for a motor vehicle, having a piston transversely oriented overall and fixed with respect to rotation to the casing, wherein it has a torsion damper according to the first variant above, the web being fixed to the turbine wheel and the guide washer supporting a friction disc provided on each face with a friction lining adapted to being clamped between the piston and the transverse wall of the casing.

The present invention also has as its object a locking clutch mounted between the casing and the turbine wheel of a hydrokinetic coupling device, notably for a motor vehicle, having a piston transversely oriented overall, wherein it has a torsion damper according to the second variant above, the web being fixed to the turbine wheel and the transverse wall of the casing being provided with a friction lining adapted to being clamped between the piston and the said transverse wall.

BRIEF DESCRIPTION OF THE DRAWINGS

In order to make the object of the invention better understood, embodiments depicted in the accompanying drawings will now be described by way of purely illustrative and non-limitative example.

In these drawings:

FIG. 6 is a partial view similar to FIG. 1 showing a variant of a clutch according to the invention, in cross section along VI—VI in FIGS. 7 and 8;

FIGS. 9 and 10 are views in cross section along IX—IX and X—X respectively in FIGS. 7 and 8, with the turbine wheel;

FIG. 11 is a partial perspective view showing how the two parts forming the guide washer of the clutch in FIGS. 6 to 10 are fixed together;

FIG. 12 is similar to FIG. 11 and depicts a variant fixing;

FIG. 13 is a view in the direction of the arrow XII in FIG. 12.

DESCRIPTION OF THE PREFERRED EMBODIMENTS

Figure 1:
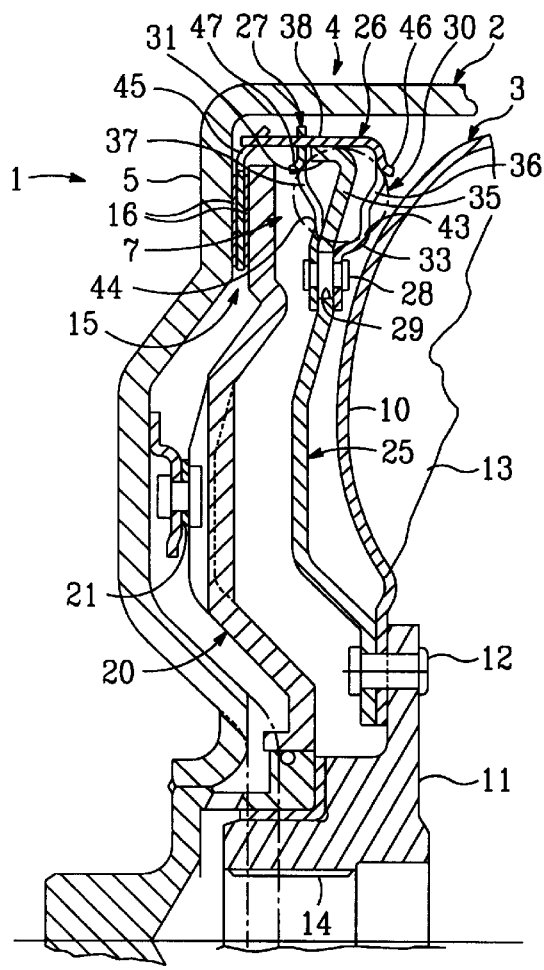
FIG. 1 shows partially in cross section a locking clutch in a hydrokinetic coupling device equipped with a torsion damper according to the invention.

Looking at FIG. 1, it can be seen that the locking clutch 4 is mounted in a hydrokinetic coupling device 1; this device 1, partially depicted in this figure, has a torque converter 3, of which only the turbine wheel 10 is partially visible, and the locking clutch 4 arranged in a sealed casing 2.

The casing 2 forms a driving element and is able to be linked with respect to rotation to the crankshaft of the internal combustion engine of the motor vehicle; this casing 2 includes an annular transverse wall 5 forming part of a first shell joined to a second shell formed so as to define an impeller wheel having blades fixed to the internal face of this second shell; the turbine wheel 10 is provided with blades 13.

The turbine wheel 10 is connected to a central hub 11 by rivets 12, which hub 11 has longitudinal ribs 14 on the inside to drive a driven shaft.

The hub 11 constitutes the output element of the locking clutch 4 which is positioned axially between the transverse wall 5 of the casing 2 and the turbine 10 of the torque converter 3.

The clutch 4 includes a torsion damper 7, a piston 20 mounted so as to be axially mobile and at least one friction lining 16 associated with the piston 20 and suitable for being clamped between the said piston 20 and the transverse wall 5 of the casing 2.

The torsion damper 7 comprises two coaxial parts mounted so as to be mobile with respect to each other counter to circumferentially acting springs 30, namely an input part consisting of a guide washer 26–27 and an output part consisting of a web 25.

The web 25 extends substantially transversely and is fixed at its internal periphery to the hub 11; according to the example depicted, this fixing is obtained by using the rivets 12 which fix together the turbine 10 and the said hub 11.

At its external periphery, the web 25 has notches extending circumferentially and in which are positioned the circumferential-action springs 30, in this case helical springs, which bear on the edges 35 of these notches; as can be seen, these edges 35 extend practically diametrically with respect to the springs 30, which consequently find a good support thereon; to this end, they are guided and held in this position by means of the guide washer 26–27, which will now be described.

The guide washer 26–27 comprises two parts, respectively 26 and 27. The part 26, or first part, is an annular part whose section along a plane passing through the axis is in the overall shape of an inverted L having a transverse lateral wall 33 extended at its external part by a skirt 38 extending axially; the part 27, or second part, is in the shape of a ring extending transversely; the second part 27 and the lateral transverse wall 33 of the first part 26 are positioned axially on each side of the web 25, in the vicinity of its external periphery, the transverse lateral wall 33 of the first part 26 being positioned on the side of the turbine 10 while the second part 27 is positioned on the side of the piston 20; the skirt 38 of the first part 26 covers the external periphery of the web 25 in line with an axial rim 31 which the latter has.

The transverse lateral wall 33 of the first part 26 and the second part 27 have apertures 43, 44 respectively in them, which extend circumferentially and which receive the springs 30, which bear on the radial end edges 36, 37 of the said apertures 43, 44; at their external periphery, the apertures 43, 44 are provided with flaps 46, 47 respectively, which, jointly with the skirt 38 of the first part 26, guide the springs 30, having regard notably to the centrifugal force to which they are subjected in operation.

At their internal periphery, the transverse lateral wall 33 of the first part 26 and the second part 27 are assembled by braces 28 which pass through circumferentially elongated passages 29 formed in the web 25, this arrangement enabling the relative circumferential clearance of the web 25 and guide washer 26-27 to be limited angularly.

Figure 2:
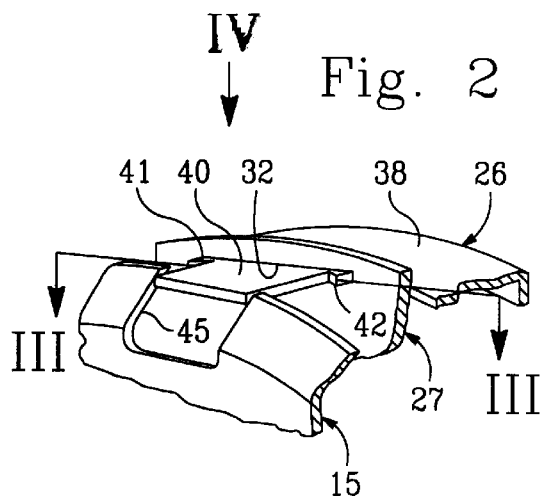
FIG. 2 is a partial perspective view showing how the two parts forming the guide washer of the clutch in FIG. 1 are fixed together.
Figure 3:
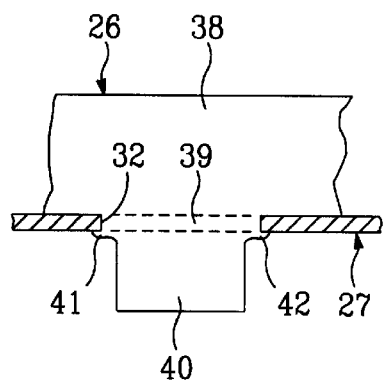
FIG. 3 is a view in cross section along Ill—Ill in FIG. 2.
Figure 4:
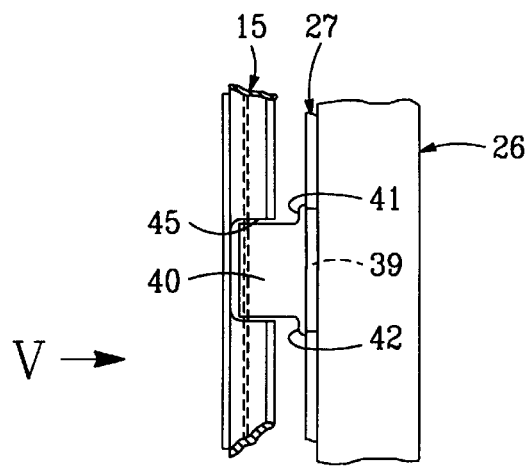
FIG. 4 is a view in the direction of the arrow IV in FIG. 2.
Figure 5:
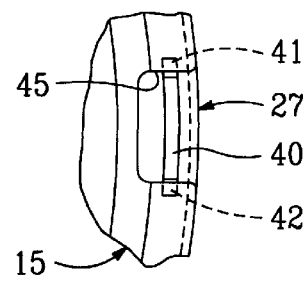
FIG. 5 is a view in the direction of the arrow V in FIG. 4.
Figure 7:
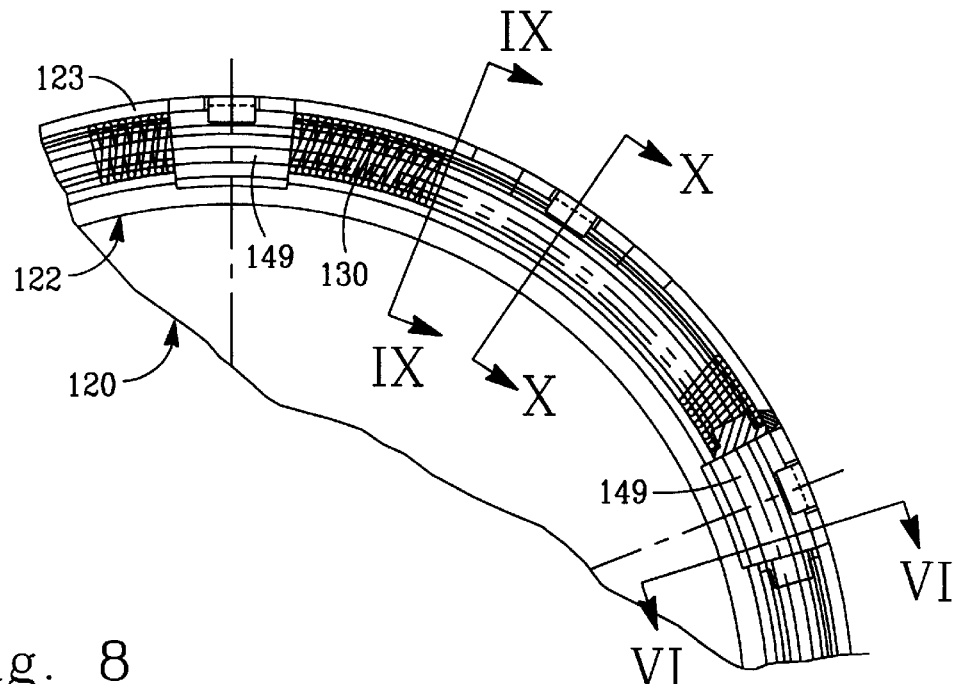
FIG. 7 is a partial plan view in the direction of the arrow VII in the figure, without the turbine wheel.

At its external periphery, the second part 27 is provided with slots 32, more easily visible in FIGS. 2 and 3, extending circumferentially, regularly distributed and through which there pass axial lugs 39 on the skirt 38 of the first part 26; more precisely, as FIGS. 2 to 5 show, the axial lugs 39 are, to within the assembly clearance, fitted in the slots 32; the axial lugs 39 are provided at their end with fingers narrower than the axial lugs 39 so as to define steps 41, 42 which, by crimping, as the figures show, enable the two parts 26 and 27 to be fixed together.

The fingers 40, which extend axially beyond the second part 27, fit in notches 45 formed at the external periphery of a friction disc 15 provided on each of its faces with a friction lining 16; the friction disc 15 is disposed axially between the transverse wall 5 of the casing 2 and the piston 20, the notch 45 being provided in one portion of the disc 15 extending radially beyond the external periphery of the piston 20; the friction disc 15 is of the suspended type, being driven in rotation by the fingers 40 cooperating with the lateral edges of the notches 45.

The operation of the locking clutch 4 which has just been described results from the above; it will be recalled that in all cases the turbine wheel 10 is driven by the impeller wheel by means of the circulation of the fluid contained in the casing 2; after the vehicle has started up, the locking clutch 4 permits, in order to avoid slip phenomena between the turbine and impeller wheels, the fixing together of the driven element 11 and driving element 2.

This is because, when under the effect of hydraulic pressure the piston 20 clamps the friction disc 15 between itself and the transverse wall 5 of the casing 2, the locking which results therefrom permits direct driving of the driven shaft, such as the input shaft of the gearbox, by the flutes 14 on the hub 11 fixed to the casing 2 connected with respect to rotation to the crankshaft of the engine of the vehicle; by means of the torsion damper 7, this locking occurs without jolts, and vibrations from the engine are filtered.

FIGS. 6 to 11 show diagrammatically a variant of a torsion damper for a locking clutch according to the invention.

According to this variant, one of the two parts of the guide washer consists of the piston itself.

More precisely, with reference to the figures, it can be seen that in this case the casing 102 carries internally on its transverse wall 105 a friction lining 116 which is bonded thereto.

In this case, the web 125 is a ring welded at 134 to the turbine 110, the said ring having lugs 160 extending roughly diametrically with respect to the helical springs 130 for the bearing of the latter.

The piston 120 belongs to the locking clutch 104 and is able to clamp the friction lining 116 between its transverse wall 124 and the transverse wall 105 of the casing 102.

The piston 120 constitutes the first part of the guide washer of the locking clutch 104 and has on its external periphery an annular rim 123, or skirt, axially oriented and extending towards the turbine 110.

The guide washer has a second annular part 122 having circumferential bearing surfaces for the springs 130 consisting of the edges of areas 148, 149,150:the area 148, situated at the external periphery of the second part 122,extends axially,parallel to the edge or skirt 123 of the piston 120; the area 148 extends internally along the area 149 with a curved cross section with its convexity directed towards the transverse wall 124 of the piston 120, with which it is in contact; the area 149 extends internally along the area 150 also with a curved cross section but with its concavity directed towards the transverse wall 124; the area 150 is connected to a transverse portion 151 extending along the transverse wall 124 of the piston 120 against which it is pressed; the portion 151 extends circumferentially over 360 degrees.

The springs 130 are positioned in the angle formed by the skirt 123 and the transverse wall 124 of the piston 120, which form for the springs 130 guide and stop surfaces; opposite the latter, guide and stop surfaces are also produced in the form of flaps 156, 157 which the second part 122 has.

The piston 120 has no apertures, and only the second part 122 has apertures delimited by the bearing surfaces of the springs 130 and the brackets 156, 157.

Figure 8:
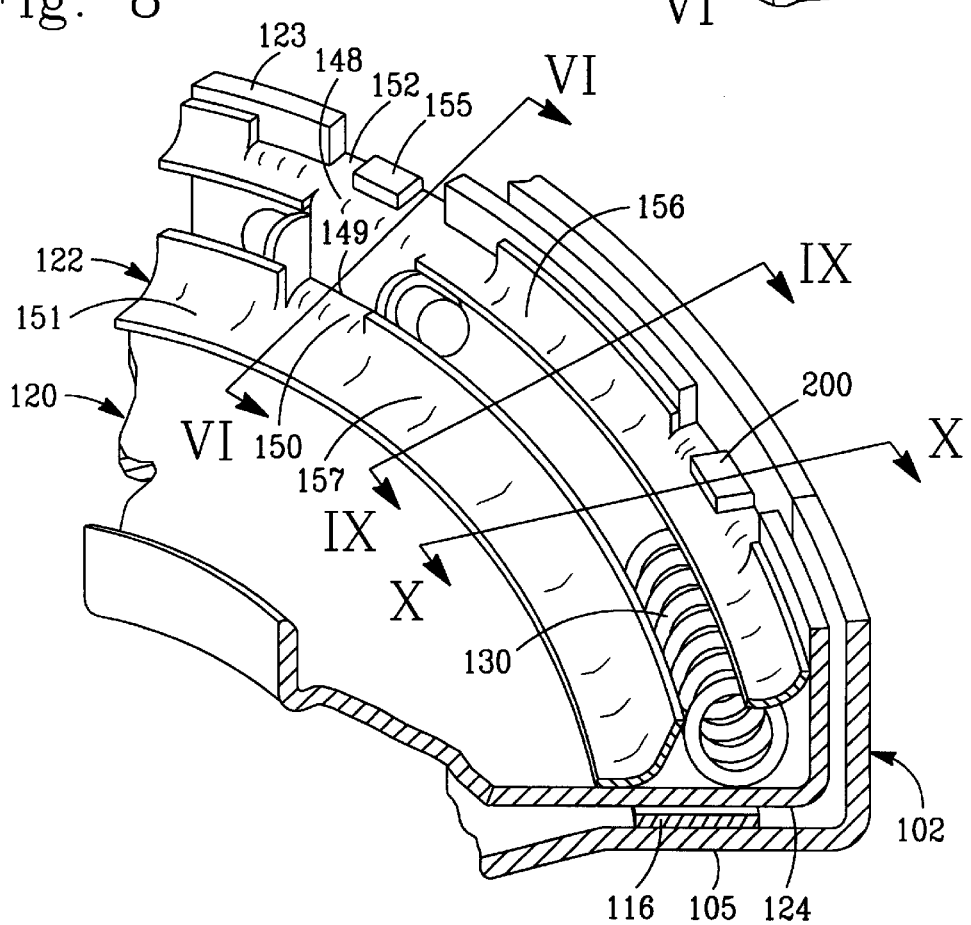
FIG. 8 is a partial perspective view in the direction of the arrow VII in FIG. 6, without the turbine wheel.

At its external periphery, the second part 122 is fixed to the skirt 123 of the piston 120 by crimping; for this purpose, the free end of the area 148 carries pairs of transverse lugs 152 distributed regularly around the circumference, as can be seen in FIG. 11 in which the two parts to be assembled are shown before and after their assembly; the transverse lugs 152 of each pair are spaced apart by a notch 158; the skirt 123 of the piston 120 has notches 153,154 in which, for the locking with respect to rotation of the second part 122 with respect to the piston 120, the transverse lugs 152 are fitted; the notches 153, 154 are separated by a crimping finger 155 which is fitted in the notch 158 of the second part 122 and the end of which is folded over by crimping, as the figures show. Another lug 200, directed radially inward, coming from the free end of the piston 120, also holds axially, as can be seen in FIGS. 8 and 10, the second part 122 by cooperation with the face thereof facing the turbine wheel 110; the lugs 200 are axially and circumferentially offset with respect to the fingers 155. The part 122 is thus axially fixed with respect to the piston 120.

A variant of this assembly is shown in FIGS. 12 and 13 according to this variant, the second part 122 has transverse lugs 252 fitted in notches 253 in the skirt 123 of the piston 120; the free edges of the notches 253 are battered axially for crimping, as shown in 240; FIG. 12 shows the two parts to be assembled before and after their assembly.

In each case, the second part 27, 122, made of metal in this case, is connected both axially and with respect to rotation to the first part 26, 120, made of metal in this case. It will be appreciated that the second part 27,122 has a simple shape and that the first part 26, 120 retains the springs 30, 130 on the outside.

In general terms, the piston 20, 120, the web 25, 125, the turbine wheel 10, the casing 2 and the hub 11 are also made of metal.

We claim:

1. Torsion damper for a locking clutch able to act between the driving element and the driven element of a hydrokinetic coupling device, having two coaxial parts able to move with respect to each other and counter to circumferentially acting springs, namely an input part provided with a guide washer and an output part provided with a web, in which the guide washer has a holding portion and bearing portions bordering on circumferentially extending apertures receiving the springs, to respectively hold the springs and enable them to bear, while the web also has bearing portions to enable the springs to bear, wherein the guide washer consists of two parts, a first part and a second part, assembled by crimping, and in that the first part retains the springs on the outside, and wherein the first part is an annular part whose section along a plane passing through the axis is in the overall shape of an inverted L with a transverse lateral wall extended on its external part by a skirt extending axially and by the fact that the second part is in the shape of a ring extending transversely the second part is provided at its external periphery with circumferentially extending slots through which there pass axial lugs on the skirt of the first part, and the axial lugs are provided at their end with fingers narrower than the axial lugs and defining steps which are crimped to fix the first and second parts together.

2. Damper according to claim 1, wherein the first part is an annular part whose section along a plane passing through the axis is in the overall shape of an inverted L with a transverse lateral wall extended on its external part by a skirt extending axially and by the fact that the second part is in the shape of a ring extending transversely.

3. Damper according to claim 1, wherein the fingers extend axially beyond the second part and are designed to fit into notches formed at the external periphery of a friction disc provided on each of its faces with a friction lining.

4. Torsion damper for a locking clutch able to act between the driving element and the driven element of a hydrokinetic coupling device, having two coaxial parts able to move with respect to each other and counter to circumferentially acting springs, namely an input part provided with a guide washer and an output part provided with a web, in which the guide washer has a holding portion and bearing portions bordering on circumferentially extending apertures receiving the spring, to respectively hold the springs and enable them to bear, while the web also has bearing portions to enable the springs to bear, wherein the guide washer consists of two parts, a first part and a second part, assembled by crimping, and in that the first part retains the springs on the outside, wherein a friction lining is carried by the driving element and the first part consists of a piston and by the fact that the first part has a transverse wall and has at its external periphery an axially oriented skirt;

wherein the web is a ring having lugs for the springs to bear, and wherein the second part is an annular part having bearing surfaces for the springs consisting of the edges of areas of which an axial one extends axially parallel to the skirt, the second part is fixed to the skirt by transverse lugs carried by the free end of the axial area, and the transverse lugs are grouped in pairs, each pair being spaced apart by a notch, the skirt having notches in which the said transverse lugs are fitted, the notches formed in the skirt being separated by a finger, fitted in the notch separating two transverse lugs of the same pair, the end of which is folded over by crimping.

* * * * *